United States Patent
Almousa et al.

(10) Patent No.: US 11,220,049 B2
(45) Date of Patent: Jan. 11, 2022

(54) SYSTEM AND METHOD FOR THREE-DIMENSIONAL PRINTING OF FIBER REINFORCED THERMOPLASTICS WITH MULTI-AXIAL REINFORCEMENT

(71) Applicant: Saudi Arabian Oil Company, Dhahran (SA)

(72) Inventors: Hassan Almousa, Dhahran (SA); Ihsan Taie, Dhahran (SA); Mohamed Bouhrara, El Jadida (MA)

(73) Assignee: Saudi Arabian Oil Company, Dhahran (SA)

( * ) Notice: Subject to any disclaimer, the term of this patent is extended or adjusted under 35 U.S.C. 154(b) by 216 days.

(21) Appl. No.: 16/667,614

(22) Filed: Oct. 29, 2019

(65) Prior Publication Data
US 2021/0122111 A1   Apr. 29, 2021

(51) Int. Cl.
*B29C 64/209*   (2017.01)
*B33Y 30/00*   (2015.01)
(Continued)

(52) U.S. Cl.
CPC .......... *B29C 64/209* (2017.08); *B29C 64/241* (2017.08); *B29C 64/393* (2017.08);
(Continued)

(58) Field of Classification Search
CPC ... B29C 64/209; B29C 64/393; B29C 64/241; B33Y 30/00; B33Y 50/02; B33Y 70/00
See application file for complete search history.

(56) References Cited

U.S. PATENT DOCUMENTS 6,645,333 B2   11/2003   Johnson et al.
9,126,367 B1   9/2015   Mark et al.
(Continued)

FOREIGN PATENT DOCUMENTS

CN   104441658 A   3/2015
CN   105172144 A   12/2015
(Continued)

OTHER PUBLICATIONS

International Search Report and Written Opinion in Corresponding PCT Application No. PCT/US/2020/057677 dated Feb. 9, 2021. 13 pages.
Yeong. W, Agarwala S, Yap Y, Goh, G. 'Recent Progress in Additive Manufacturing of Fiber Reinforced Polymer Composite'. Advanced Materials Technology, vol. 4 issue 1.
(Continued)

*Primary Examiner* — Joseph S Del Sole
*Assistant Examiner* — John Robitaille
(74) *Attorney, Agent, or Firm* — Leason Ellis LLP

(57) ABSTRACT

A system is disclosed for three-dimensional (3D) printing of multi-directional woven components with hierarchical z-axis reinforcements using pre-impregnated FRP materials. The exemplary 3D printing system includes a primary extrusion nozzle system and a secondary extrusion needle system supported by a multi-axis truss. The primary extrusion nozzle system is comprised of at least two sub-extruders and rotation mechanisms for controllably rotating the extrusion nozzle and rotating the two-sub extruders. The extrusion nozzle assembly and the two sub-extruders can be controllably and independently rotated to extrude a braided yarn with a precise fiber-spacing. Additionally, a separate extrusion needle is provided for vertical interpenetration of the needle into the braided workpiece such that material can be extruded at precise depth through side-facing needle openings thereby providing z-axis reinforcement to the workpiece.

18 Claims, 7 Drawing Sheets

(51) Int. Cl.
  *B29K 101/12* (2006.01)
  *B33Y 50/02* (2015.01)
  *B33Y 70/00* (2020.01)
  *B29C 64/393* (2017.01)
  *B29C 64/241* (2017.01)
  *B29K 105/08* (2006.01)

(52) U.S. Cl.
  CPC .............. *B33Y 30/00* (2014.12); *B33Y 50/02* (2014.12); *B33Y 70/00* (2014.12); *B29K 2101/12* (2013.01); *B29K 2105/08* (2013.01)

(56) References Cited

U.S. PATENT DOCUMENTS

| | | | |
|---|---|---|---|
| 2014/0291886 A1 | 10/2014 | Mark et al. | |
| 2014/0328963 A1 | 11/2014 | Mark et al. | |
| 2014/0361460 A1 | 12/2014 | Mark et al. | |
| 2015/0165691 A1 | 6/2015 | Mark et al. | |
| 2018/0067464 A1 | 3/2018 | Budge et al. | |
| 2018/0186071 A1 | 7/2018 | Jaehnicke | |

FOREIGN PATENT DOCUMENTS

| | | |
|---|---|---|
| CN | 106553341 A | 4/2017 |
| CN | 107571491 A | 1/2018 |
| CN | 108790144 A | 11/2018 |
| WO | 2018195033 A1 | 10/2018 |

OTHER PUBLICATIONS

Hui D, Wang X, Jiang M, Zhou Z, Gou J. '3D printing of polymer matrix composites: A review and prospective'. Composites Part B: Engineering. vol. 110, p. 442-458.

Blok, L.G., Longana M.L., 'An investigation into 3D printing of fiber reinforced thermoplastic composites'. Additive manufacturing, 2017.

F. Ning, W. Cong, J. Qiu, J. Wei, and S. Wang, "Additive manufacturing of carbon fiber reinforced thermoplastic composites using fused deposition modeling," Compos. Part B Eng., vol. 80, pp. 369-378, 2015.

H. L. Tekinalp, V. Kune, G. M. Velez-Garcia, C. E. Duty, L. J. Love, A. K. Naskar, C. A. Blue, and S. Ozcan, "Highly oriented carbon fiber-polymer composites via additive manufacturing," Compos. Sci. Technol., vol. 105, pp. 144-150, 2014.

Gao, Yan & Ko, Frank & Hu, Hong. Integrated Design for Manufacturing of Braided Preforms for Advanced Composites Part I: 2D Braiding. Applied Composite Materials. 2013.

Mark Forged, "High strength 3D printing with continuous fiber," 2016. Retrieved from the Internet: URL:https://markforged.com/materials/carbon-fiber/ [Retrieved on Dec. 21, 2019] the whole document.

Mark Forged, Material Data Sheet Composites, Sep. 9, 2019. Retrieved from the Internet: URL:http://static.markforged.com/downloads/composites-data-sheet.pdf [Retrieved on Dec. 21, 2019] the whole document.

Yang, Chuncheng, et al. "3D printing for continuous fiber reinforced thermoplastic composites: mechanism and performance." Rapid Prototyping Journal 23.1 (2017): 209-215.

Bilisik, Kadir. Three-dimensional braiding for composites: A review. Textile Research Journal. 83. 2013.

SYSTEM AND METHOD FOR THREE-DIMENSIONAL PRINTING OF FIBER REINFORCED THERMOPLASTICS WITH MULTI-AXIAL REINFORCEMENT

FIELD OF THE DISCLOSURE

The present disclosure is directed to an apparatus and method for additive manufacturing of 3D printed objects. In one particular arrangement, the present disclosure describes a printing apparatus having an extrusion nozzle and extrusion needle for printing multi-directional woven components with hierarchical z-axis reinforcements using pre-impregnated fiber-reinforced plastic materials.

BACKGROUND OF THE DISCLOSURE

Additive manufacturing technologies enable construction of three-dimensional (3D) objects from computer designs, such as CAD files. 3D printing is a commonly used additive manufacturing process and typically involves sequentially depositing, curing, fusing, or otherwise forming cross-sectional layers of material to define a 3D object.

Fiber reinforced thermoplastic (FRTP) materials have recently received significant attention from many industries due to their distinguished advantage of achieving high strength-to-weight ratio over conventional materials for light-weighting purposes. Unlike additive manufacturing (AM) for composites, the current processing techniques for high-volume production of complex shape components such as injection molding, compression molding, resin transfer molding and filament winding are costly and require molding which limits the degree of complexity.

In operation of existing 3D printing system using FRTP feedstocks, the filament either is heated to semiliquid state and the continuous fiber is extruded by the system, or the filament is prepared with impregnated composites. For example, some systems coat continuous fibers with a thermoplastic matrix prior to printing, which can increase manufacturing time. Other systems feed an extrusion head with a continuous fiber and multiple thermoplastic matrixes that are deposited in a conventional, 2D layer-by-layer printing method. These approaches, however, can result in manufactured products with low inter-layer bonding strength.

SUMMARY OF THE DISCLOSURE

According to an aspect of the present disclosure, there is provided a device for three-dimensional (3D) printing of a fiber reinforced thermoplastic (FRTP) material with multi-axial reinforcements. The device comprises an extrusion nozzle system for 3D printing a braided FRTP structure within an object assembly area of a three-dimensional printer. The extrusion nozzle system includes an extrusion nozzle and an extrusion needle system.

In particular, the extrusion nozzle system comprises a first sub-extruder and a second sub-extruder that each have a respective channel. The first and second sub-extruders are configured to receive a filament material and discharge a respective FRTP strand from an outlet of the extrusion nozzle. the extrusion nozzle system also comprises one or more rotation mechanisms configured to rotate the extrusion nozzle about a rotational axis. The rotation mechanisms are also configured to rotate each of the first and second sub-extruders individually about a respective rotational axis and thereby 3D printing the braided FRTP structure.

The extrusion needle system is configured for reinforcing the braided FRTP structure in a z-axis direction. The extrusion needle system includes an extrusion needle having a needle point, a hollow interior channel and an opening provided along a length of the needle. The needle is configured to receive a filament material within the needle channel and discharge the filament material therethrough. The extrusion needle system also includes a needle position control mechanism for adjusting the height of the needle in the z-axis direction to penetrate the needle into the braided FRTP structure such that the filament material is discharged from the opening at a prescribed depth within the braided structure.

According to another aspect of the present disclosure, a system for additive manufacturing of an object from fiber reinforced thermoplastic (FRTP) material having multi-axial reinforcements is provided. The system comprises a platform defining an object assembly area and a print head.

The print head comprises an extrusion nozzle system for 3D printing a braided FRTP material structure within the object assembly area. More specifically, the extrusion nozzle system includes an extrusion nozzle comprising a first sub-extruder and a second sub-extruder each having a respective channel and being configured to receive a filament material and discharge a respective FRTP strand from an outlet of the extrusion nozzle. The extrusion nozzle system also includes one or more rotation mechanisms configured to rotate the extrusion nozzle about a rotational axis and configured to rotate each of the first and second sub-extruders individually about a respective rotational axis.

The print head also comprises an extrusion needle system for reinforcing the braided FRTP structure in a z-axis direction. More specifically, the extrusion needle system includes an extrusion needle having a needle point, a hollow interior channel and an opening provided along a length of the needle. The needle is configured to receive a filament material within the needle channel and discharge the filament material therethrough. The extrusion needle system also includes a needle position control mechanism for adjusting the height of the needle in the z-axis direction to penetrate the needle into the braided FRTP structure such that the filament material is discharged from the opening at a prescribed depth within the braided structure.

The system for additive manufacturing further comprises a position control mechanism configured to controllably position the print head within the object assembly area in the x-y direction. Additionally, a system for additive manufacturing includes a control computer including a processor and a memory, wherein the control computer is configured to control operation of the print-head and the position control mechanism according to an instruction set stored in the memory and executable by the processor.

These and other aspects, features, and advantages can be appreciated from the accompanying description of certain embodiments of the disclosure and the accompanying drawing figures and claims.

BRIEF DESCRIPTION OF THE DRAWINGS

The foregoing and other features of the arrangements of the present disclosure will be more readily apparent from the following detailed description and drawings of an illustrative embodiment of an invention encompassed by the disclosure.

DESCRIPTION OF CERTAIN EMBODIMENTS OF THE DISCLOSURE

By way of overview and introduction, the present application describes a system and method for additive manufacturing, including 3-D printing, of fiber reinforced thermoplastics having multi-axial reinforcements.

Generally, existing 3D printing systems for preparing FRTP materials are incapable of printing multi-axial 3D FRTP materials. Additive manufacturing offers the flexibility to tune the fibers' volume and orientation, however using FRTP materials can require addressing several concerns and challenges, including:

Nature of reinforcements and matrices: for example, provide high compatibility between matrix and fiber materials.

Fiber-to-matrix bonding: for example, provide strong adhesion between matrix and fiber.

Homogeneity of fibers: for example, provide constant fiber distribution in matrix.

Fibers alignment: for example, predefine location and direction of FRP.

Interlayer bonding: for example, provide good interlayer fusion to avoid delamination.

Structural porosity: for example, minimize unwanted voids.

Given the state of the art, in order to overcome the disadvantages of existing systems and better utilize 3D printing for production of FRTP components for industrial applications, what is needed is a printing system which is capable of printing multi-directional woven components with hierarchical z-axis reinforcements using pre-impregnated FRP materials and which can address the challenges relating to continuous FRTP alignments and interlayer bonding. It is with respect to these and other considerations that the disclosure made herein is presented.

Figure 1:
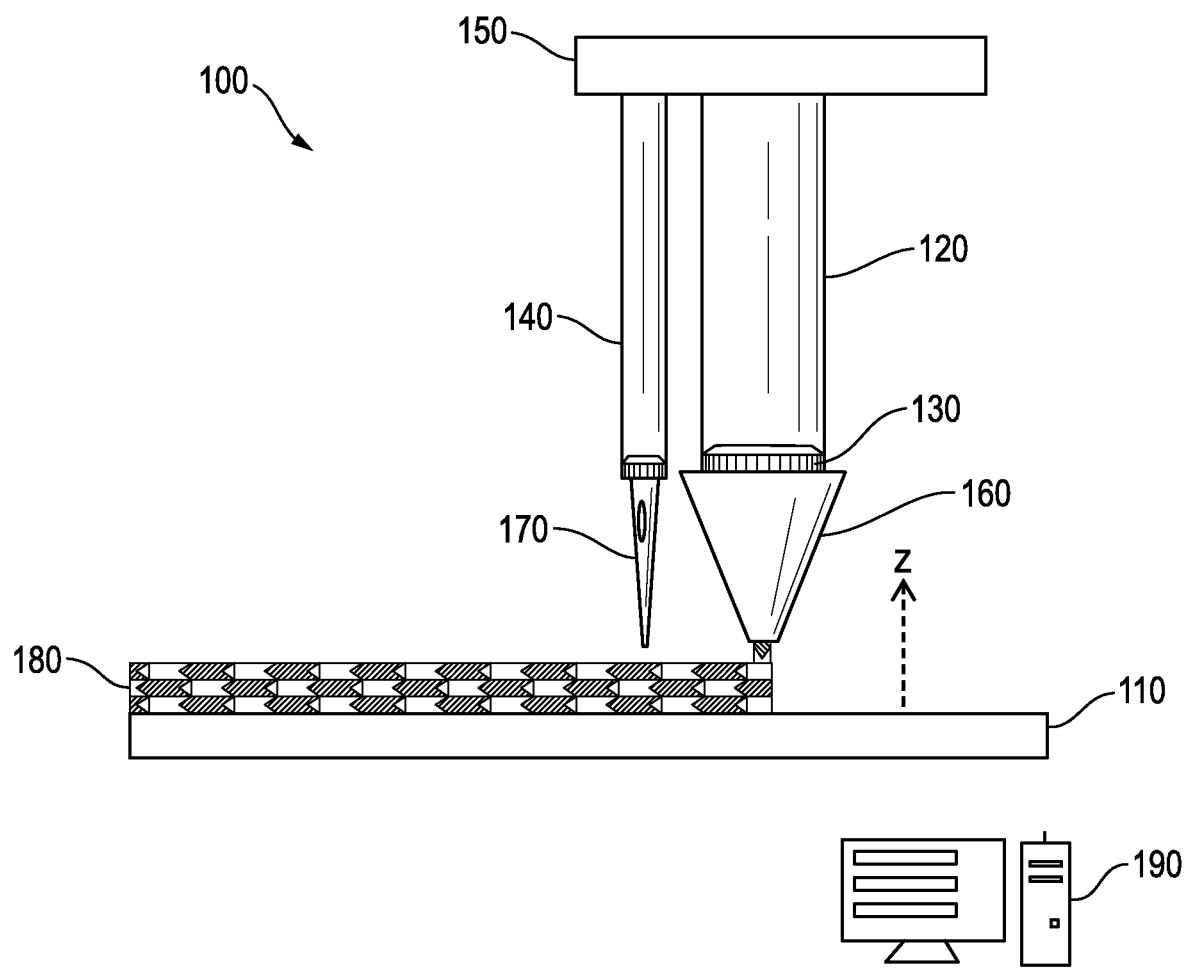
FIG. 1 is a high-level diagram illustrating an exemplary configuration of a system for 3D printing of fiber reinforced thermoplastics with multi-axial reinforcements according to an embodiment.

FIG. 1 is a schematic representation of an exemplary system for 3D printing of woven composite materials with z-axis reinforcement 100. The exemplary system 100 includes a print head comprising a primary extrusion nozzle system 160, a secondary extrusion needle system 170. The print-head can be supported by a multi-axis truss 150 suitable for moving the print-head within the X-Y area of a platform 110. The system 100 can also include one or more material feed systems. For instance, as shown, the extrusion needle 170 can be fed by a single-filament cartridge 140. Similarly, the extrusion nozzle 160 can be fed with a multi-filament cartridge 120. In the exemplary embodiment, the filaments comprise continuous filaments of pre-impregnated FRTP material, although alternative materials and feed-stock forms can be used.

The extrusion nozzle system can also include one or more rotational gears including a major rotary gear 130 for controllably rotating the nozzle during operation. As further described herein, the system 100 is configured to create a braided/woven material structure 180 (the workpiece) with z-axis reinforcement.

It should be understood that other supporting tools and devices commonly provided in 3D printing systems have been excluded from FIG. 1 for simplicity including, for example, devices for heating and controlling the "yarns" that are passed through the nozzle and needle. Also, not shown in FIG. 1 are the position control mechanisms configured to precisely move the print head within the object assembly area in the X-Y and Z directions. As would be understood, various approaches for controlling the position of the print head can be implemented. For instance, the position control mechanism can be configured to move the print-head relative to the workpiece using the multi-axis truss and/or by moving the platform. The position control mechanism can also be configured to control the z-axis position (also referred to as the height or depth) of one or more of the extrusion nozzle 160 and extrusion needle 170 within the object assembly area.

The execution of the exemplary methods for 3D printing of fiber reinforced thermoplastics with multi-axial reinforcements can be implemented with the aid of a control device, such as a processor or control computer 190. As is well understood, control devices are commonly used to electronically control machine tools, 3D printers or other such production machines and their various components. The control computer 190 advantageously serves to monitor and control operation of the various components of the system 100 based on an instruction set. The instruction set can include, for example, software programs that define how the various system components are controlled, computer-aided design (CAD) files that define the design and configuration of the object being manufactured, and computer-aided manufacturing (CAM) files that define the process for manufacturing the object using the 3D printing system. In accordance with embodiments of the disclosure, based on the instruction set, the computer 160 can be configured to precisely control the position and rotation of the extrusion nozzle and needle within the object assembly. As would be understood, the computer also 160 advantageously serves to control the extrusion process, for instance, by controlling the heating elements and filament feed devices and thereby modulating the rate or composition of the material being discharged by the extruders and needle. It should also be understood that the control device can also be part of a software component that supplements the control of a machine tool, a 3D printer or a production machine.

Figure 2:
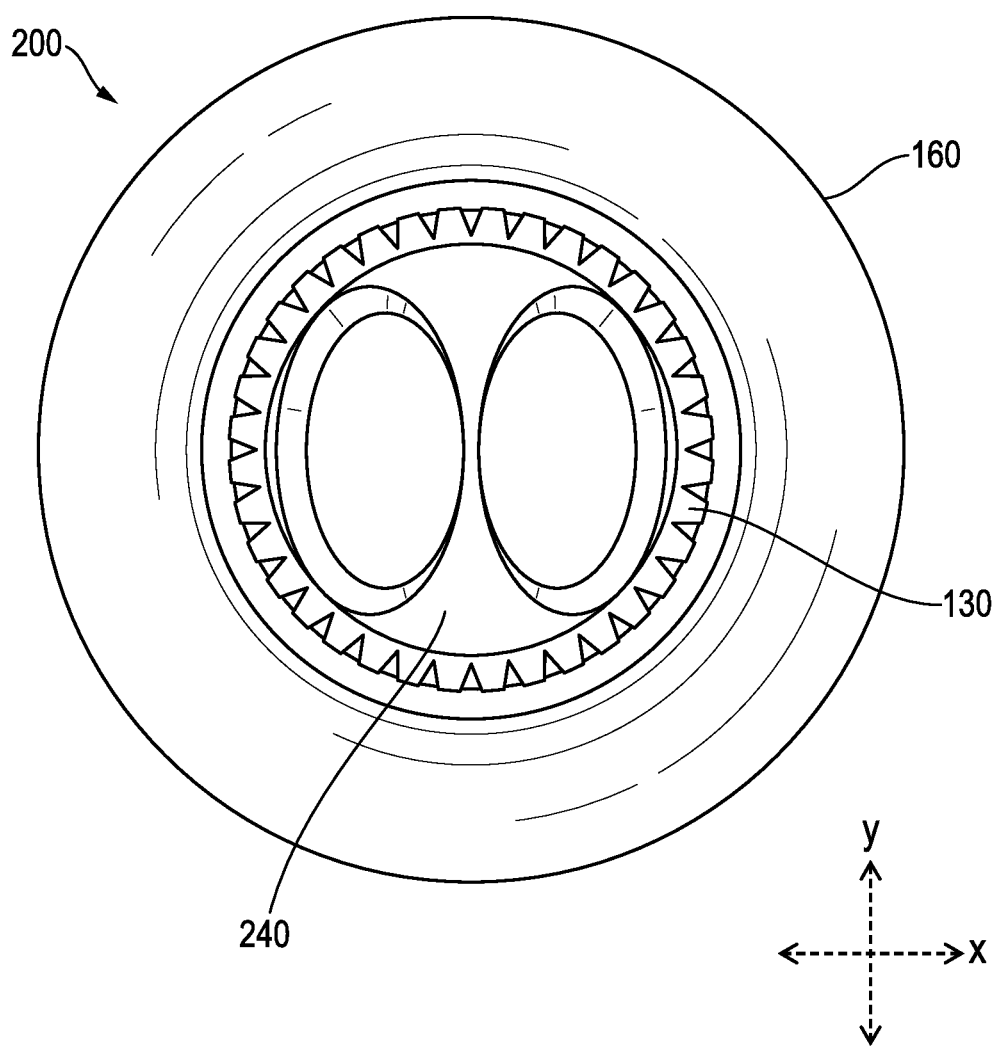
FIG. 2 is a schematic top-view diagram of an exemplary primary extrusion nozzle according to an embodiment.

FIG. 2 is a bottom plan schematic diagram of the exemplary primary extrusion nozzle 160 system having combined sub-extruders. As shown, the primary extrusion nozzle 160 can have a sub-extruder outlet 240 at a bottom end, which is the end facing the platform and workpiece. The primary extrusion nozzle 160 can also include a major rotary gear 130 provided at the top end opposite the outlet. In an exemplary embodiment, the primary extrusion nozzle system is comprised of at least two (2) sub-extruders. The sub-extruders can include a central channel arranged to receive a filament material at a top-end and discharge the extruded strand out of a bottom end of the channel. The channels of the first and second sub-extruders can be configured to converge at the outlet 240 of the nozzle. Alternatively, the sub-extruder channels can be separated and configured to extrude material through respective outlets.

Figure 3:
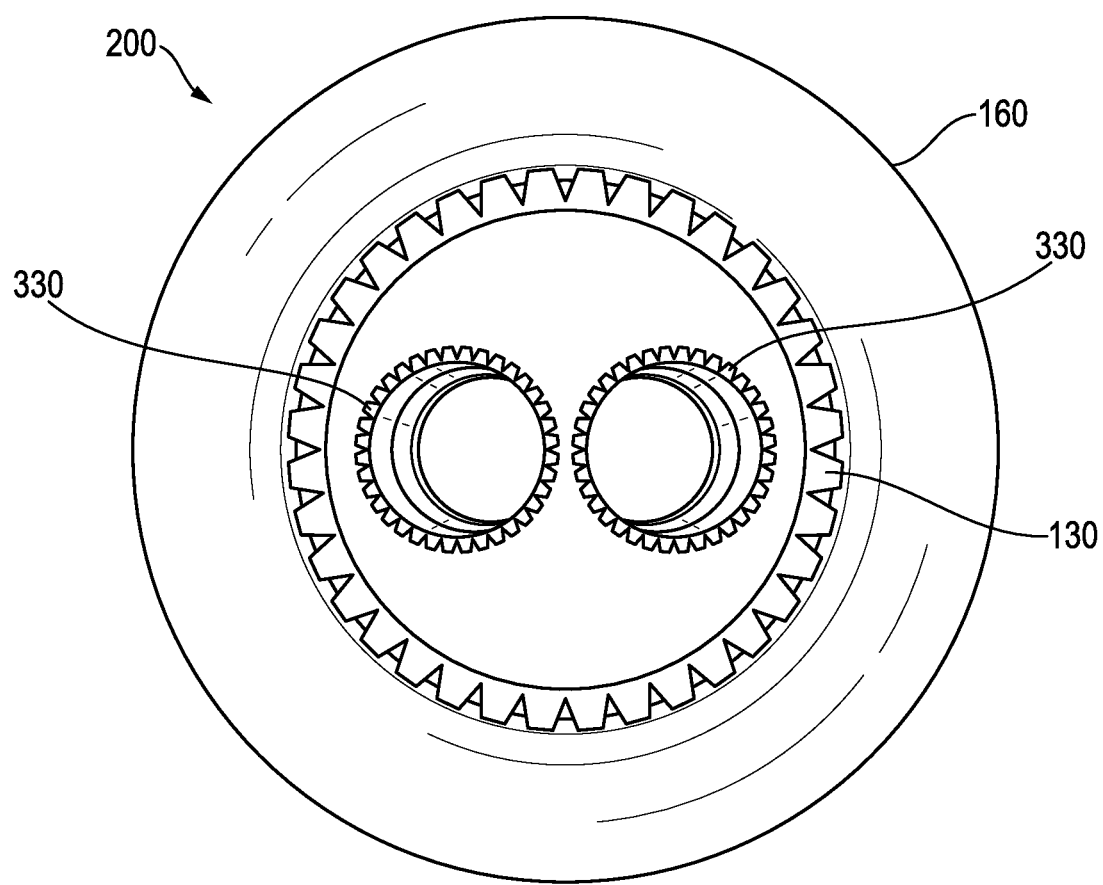
FIG. 3 is a schematic bottom-view diagram of an exemplary primary extrusion nozzle according to an embodiment.

FIG. 3 is a top-view schematic representation of two separated sub-extruders of the primary extrusion nozzle 160 system. The primary extrusion nozzle system can include two (2) rotational mechanisms for rotating the nozzle and the sub-extruders about respective rotational axes. As shown, the rotational mechanisms include gears provided at the top end of the nozzle. The first rotational mechanism can include, for example, a singular major rotating gear 130 configured to rotate the nozzle 160 and combined sub-extruders about the central axis of the nozzle which, as shown in FIG. 3, is the central axis of the outlet 240. Accordingly, the major rotating gear can be used to change the X or Y axis direction of the two sub-extruders during the printing process. In other words, the position of the sub extruder can be changed to proceed with 3D printing of an object.

As shown, the nozzle 160 can further include a second rotational mechanism including, for example, two (2) central gears 330 configured to independently rotate respective sub-extruders about a respective rotational axis. In the exemplary embodiment shown in FIG. 3, the central gears 330 can rotate the first and second sub-extruders about respective rotational axes defined by the central axis of respective channels. Additionally, the two central gears 330 preferably rotate the first and second sub-extruders in opposite directions.

In operation, a drive mechanism (not shown) drives the central gears 330 and/or the major gear 130 at respective rotational speeds, which are prescribed by the control computer 190 executing the instruction set, to extrude a braided yarn with a precise fiber-spacing. According to a salient aspect, by controllably moving and rotating the primary extrusion nozzle and respective sub-extruders, the system 100 can construct a braided structure having any number of different yarn architectures. For example, the FRP filaments extruded by the two sub-extruders cross over and under with positive and negative angles during operation of the previously discussed major and central rotational mechanisms. As such, the system 100 including the primary extrusion nozzle 160 system can implement a single-step 2D rotary braiding technique for printing a spiral braided FRTPs. Moreover, the yarn packing density can be controlled as a function of the overall fiber volume fraction in the interstitial matrix of the pre-impregnated FRTP material rather than the extrusion process. The parameters that are combined to produce the braided structure are a combination of rotating speed, number of outlets and the speed of needle-like extrusion rate to introduce the n+1 (n is the number of outlets in the original extruder) dimension and achieve the "braiding" structure at a cross-sectional level. For example, a rotating speed of more than 0 and up to 300 rpm, or even more, with two outlets in the rotating extruder will print a twisted structure. As further described herein, the twisted structure can then be filled using the extrusion needle, operating at a speed of penetration that complements the rotating speed and placed at specified positions to obtain the desired angle. Moreover, the braid angle is also pre-defined with the screw extruder outlets setup. Accordingly, as the outlets prints three or more filaments per round per minute the outcome is a braided like structure that is as well reinforced from a different angle by the needle-like extruder.

Figure 4:
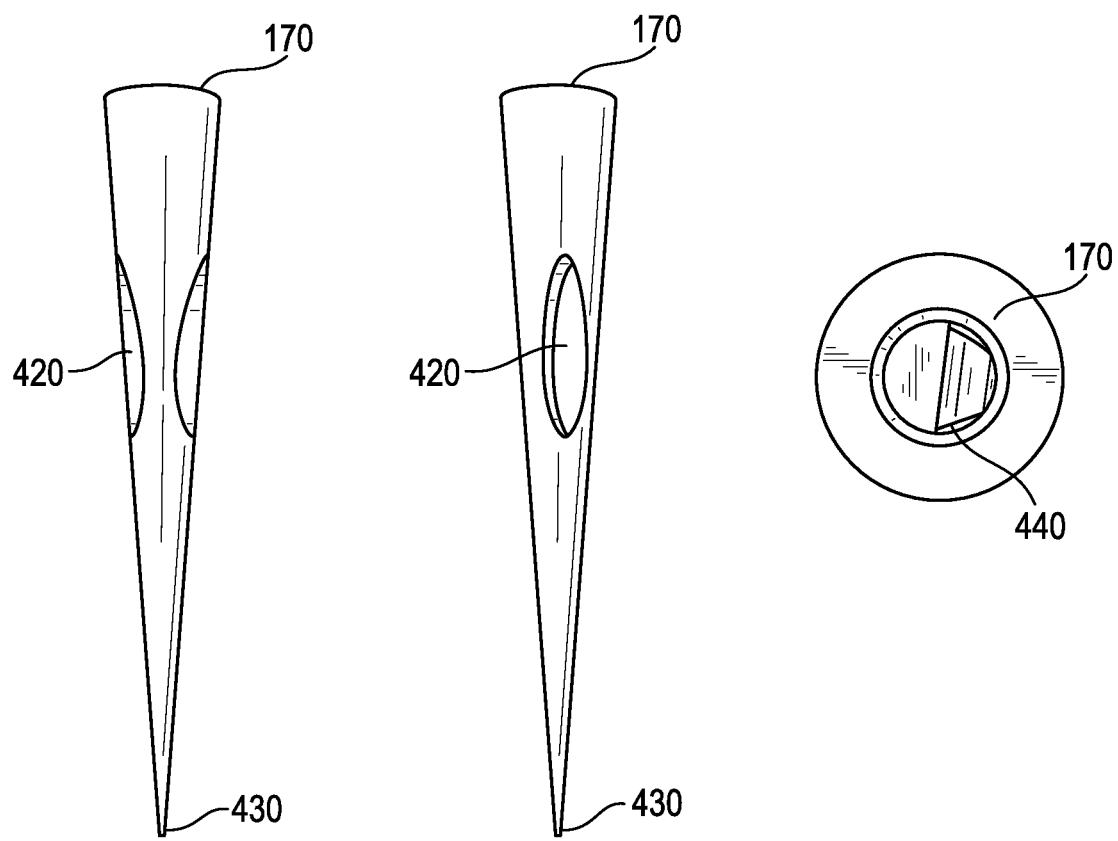
FIG. 4 are schematic diagrams showing two side-views and a top-view of an exemplary secondary extrusion needle according to an embodiment.

FIG. 4 provides a schematic of a side and top view representation of the secondary extrusion needle 170 system. The secondary extrusion needle can also be referred to as a knitting needle in that, as further described herein, it can be used in a similar manner as a sewing needle. The secondary extrusion needle 170 system can include a needle gauge having a hollow interior and an open top end 440 through which FRP can be fed into the needle. One or more oval-like openings 420 for extrusion of material therethrough can be provided along the length of the knitting needle. The needle also includes a needle-point 430 for vertical interpenetration of the needle 170 into the braided workpiece. Similar to the nozzle, the needle can also include a rotational mechanism comprising a gear for controllably rotating the needle about the needle's central axis. Accordingly, the needle can be controllably raised and lowered and rotated using position-control system (not shown) to control the height that material is extruded through the needle openings and direction.

The needle 170 can be configured to controllably perform reinforcement referred to herein as z-pinning. More specifically, as the needle enters the proximity zone in the intermediate braided yarn printed by the primary extrusion nozzle 160, z-pinning takes place. The proximity zone refers to the interface between two separately deposited material layers. The preferred z-pinning depth can be proportional to the number of printed braided layers and consequently the needle size can be designed accordingly. As a result of computer-controlled interpenetration of the needle and extrusion of material through the needle opening at a particular height, location and direction, the braided material can be reinforced in the z-axis and the interlayer bonding is enhanced. Collectively, the braided and knitted FRTP materials pre-forms a 3D inter-plaiting (woven) structure. Therefore, the structure is a biaxial woven composite after bridging the unidirectional braided fibers with a discontinuous FRTP filament having a modular penetration depth.

Figure 5:
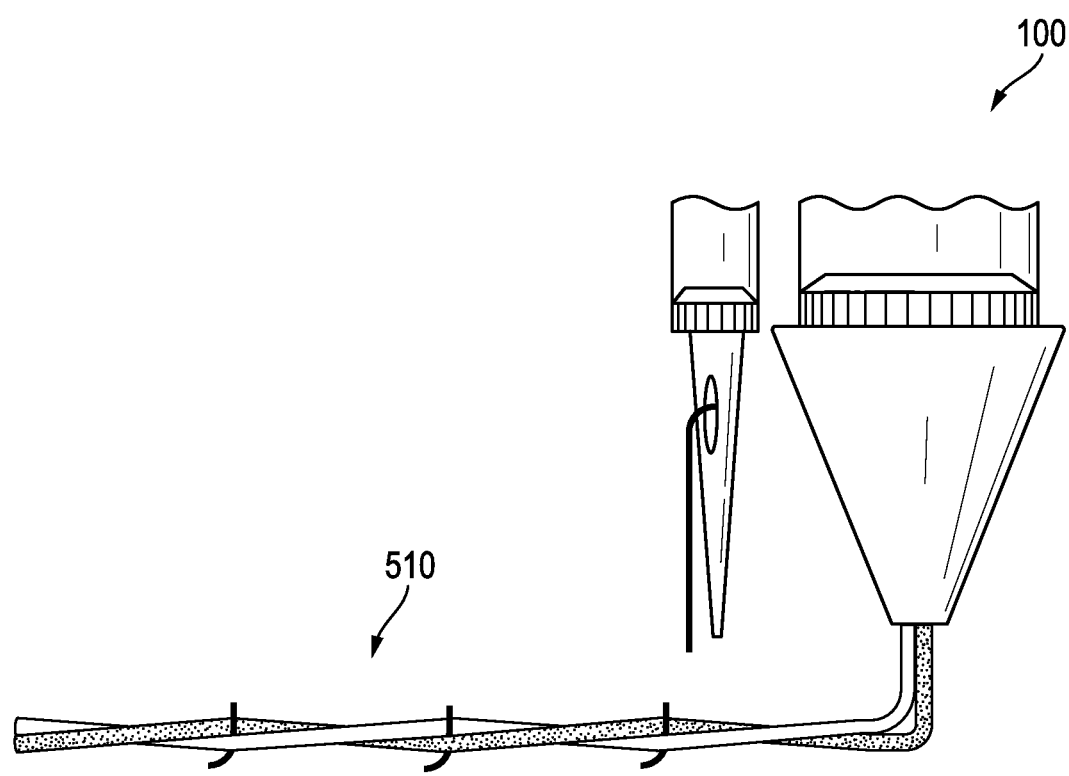
FIG. 5 is a schematic diagram showing an exemplary configuration of a woven fiber reinforced thermoplastic workpiece having multi-axial reinforcements and produced according to an embodiment.

As can be appreciated, the exemplary system for 3D printing of fiber reinforced thermoplastics with multi-axial reinforcements 100 can utilize the combination of the rotary extrusion nozzle 160 and extrusion needle 170 system to implement various braiding and knitting techniques to 3D print woven-like composite materials that are reinforced in the z-axis. For example, as shown in FIG. 5, which is a diagram showing an exemplary braided FRTP structure 510 produced using the system 100, the workpiece produced by the system 100 can consist of a pick, warp, and weft yarn elements that mimic the same fundamentals of a woven composite. As a result, the mechanical properties of the workpiece can be similar to a manufactured woven composite.

The system thus can mimic the mechanical properties of the conventionally manufactured composites by allowing the same textile parameters and additional freedom of constructing complex shapes. In particular, the mechanical properties of reinforced composite materials are contributed to several dimensions, one of which is the structural layout regardless of the construction materials. Thus, mimicking this layout will allow for similar mechanical properties as constructing a piece of composite using the conventional methods of preferring fibers to a woven structure then infusing them with resins.

Figure 6A:
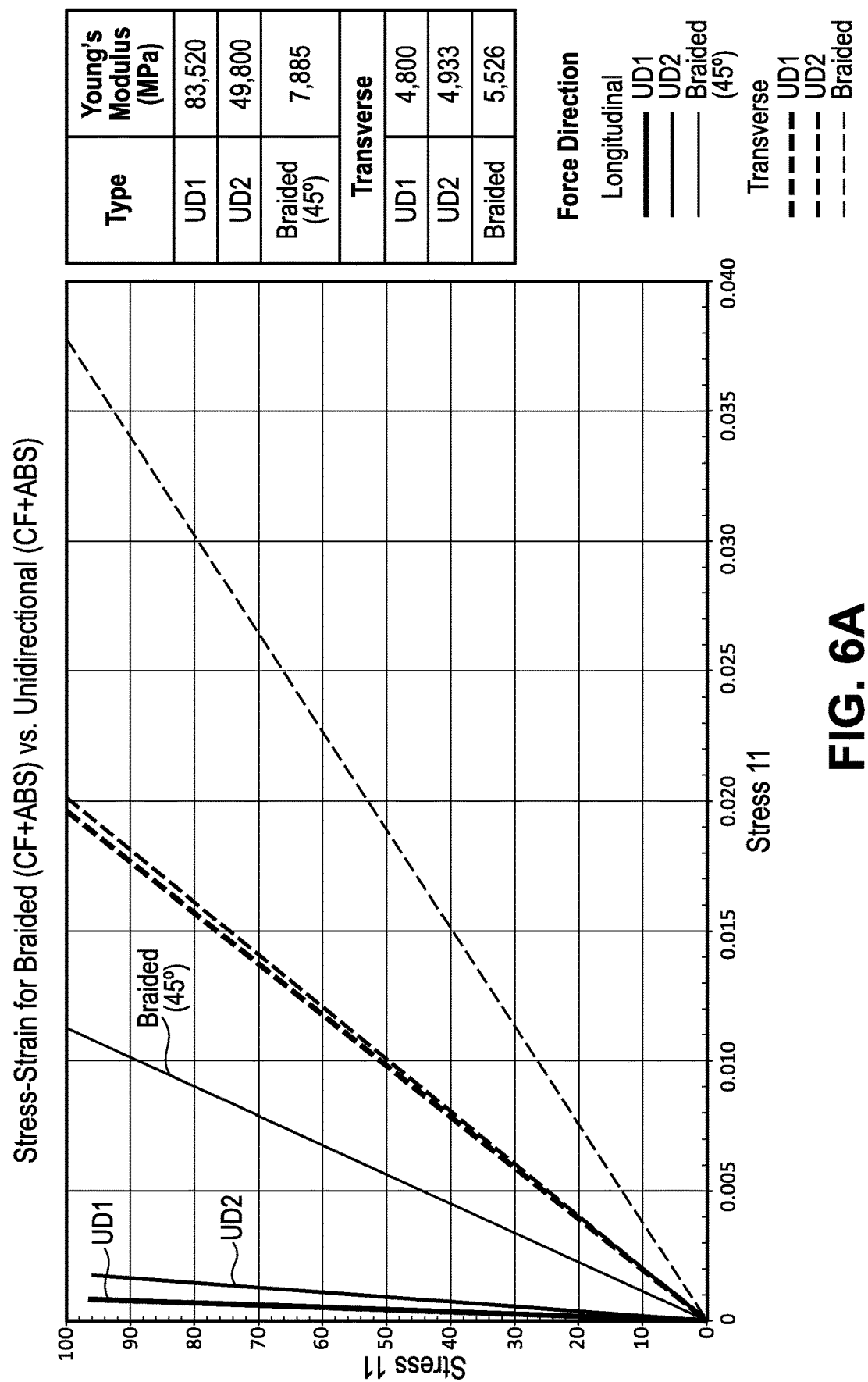
FIG. 6A is a chart plotting exemplary stress-strain testing results for braided FRTP material constructed according to an embodiment and conventional unidirectional FRTP material, as measured during testing under longitudinal or transverse forces.

Testing results demonstrate that the exemplary systems and methods for 3D printing of fiber reinforced thermoplastics with multi-axial reinforcements are suitable for producing composite material structures with improved strength over conventionally 3D printed structures. In following test cases the stress-strain mechanical properties of various samples of FRTP composite materials constructed in accordance with the disclosed embodiments and having different braiding angles is demonstrated using computer-simulated stress-strain testing for forces acting in the longitudinal or transverse directions relative to the general orientation of the woven structure. FIG. 6A is a chart plotting exemplary stress-strain testing results for a braided FRTP material sample constructed according to an embodiment of the disclosure and having a 45° (degree) braiding angle as compared to two conventionally constructed unidirectional FRTP materials. FIG. 6A illustrates the simulated stress-strain curve for these materials under forces applied in the longitudinal direction (shown in solid line) and transverse directions (shown in dashed lines). Also shown in FIG. 6A is a table of the corresponding Young's Modulus for the tested materials.

Figure 6B:
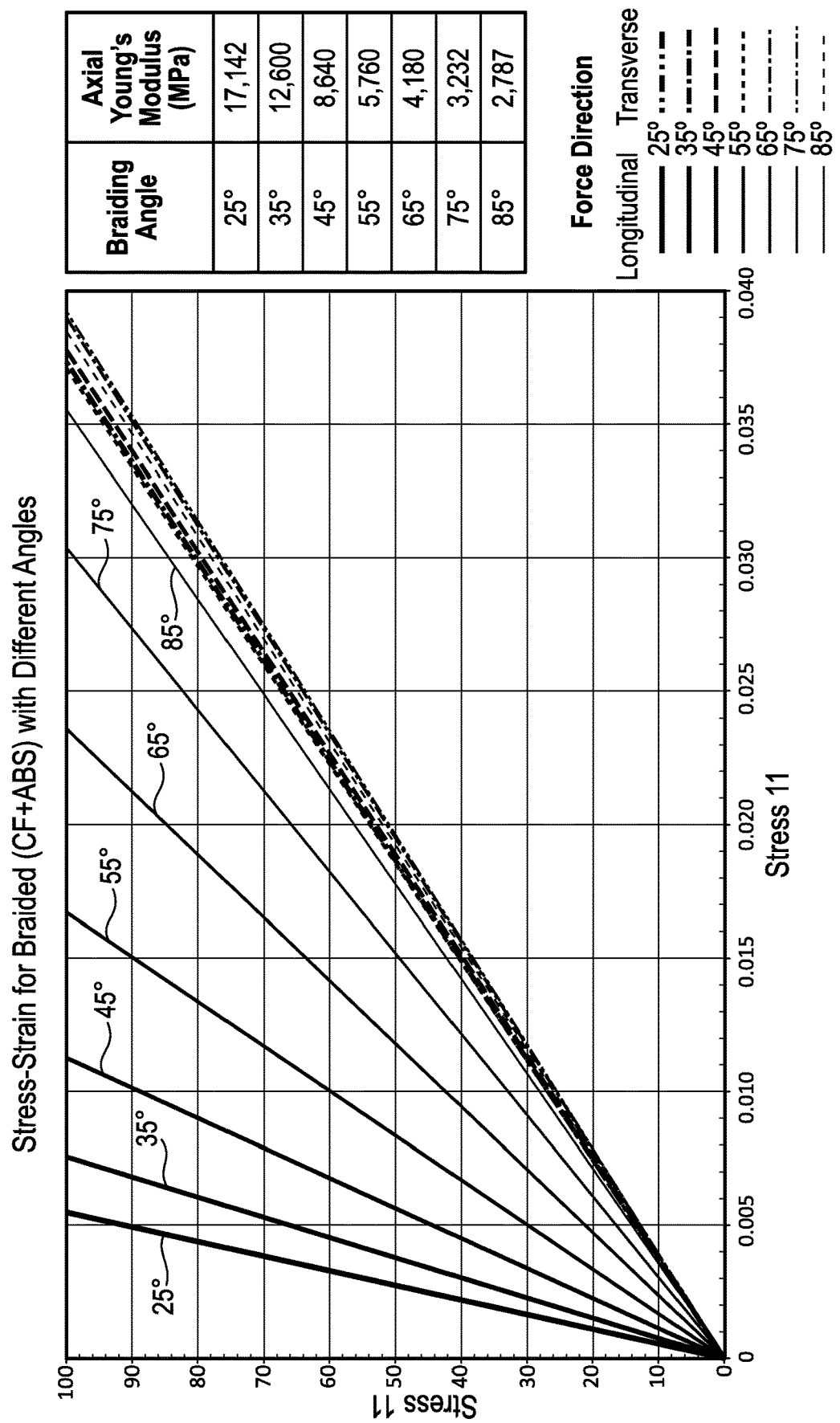
FIG. 6B is a chart plotting exemplary stress-strain testing results for FRTP materials constructed according to an embodiment with different respective braiding angles and measured under longitudinal or transverse forces.

FIG. 6B is a chart plotting simulated stress-strain testing results for various FRTP material samples constructed according to an embodiment of the disclosure, each having a different respective braiding angles (i.e., 25°, 35°, 45°, 55°, 65°, 75°, 85° braiding angle). FIG. 6B illustrates the simulated stress-strain curve for these materials under forces applied in the longitudinal direction (shown in solid line) and transverse directions (shown in dashed lines). Also shown in FIG. 6B is a table of the corresponding axial Young's Modulus for the tested materials.

At this juncture, it should be noted that although much of the foregoing description has been directed to a system for 3D printing of fiber reinforced thermoplastics with multi-axial reinforcements, the systems and methods disclosed herein can be similarly deployed and/or implemented in scenarios, situations, and settings far beyond the referenced scenarios. For instance, the exemplary systems and methods are not limited to 3D printing of FRTP materials from impregnated filaments and can be used to 3D print objects using other materials. It can be readily appreciated that the systems and methods can be effectively employed in other scenarios for 3D printing a workpiece.

It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a system, processes and computer implemented control methods, computer system, and computer program product for 3D printing of fiber reinforced thermoplastics with multi-axial reinforcements. The flowchart and block diagrams in the figures illustrate the architecture, functionality, and operation of possible implementations of systems, methods and computer program products according to various embodiments and arrangements. In this regard, each block in a flowchart or block diagrams as it relates to a computer implemented method can represent a module, segment, or portion of code, which comprises one or more executable instructions for implementing the specified logical function(s).

It should also be noted that, in some alternative implementations, the functions described herein or noted in a block diagram may occur out of the order noted. For example, two blocks or operations shown or described in succession may, in fact, be executed substantially concurrently, or may sometimes be executed in the reverse order, depending upon the functionality involved. It will also be noted that functional blocks or operations can, where applicable, be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A device for three-dimensional (3D) printing of a fiber reinforced thermoplastic (FRTP) material with multi-axial reinforcements, the device comprising:
　an extrusion nozzle system for 3D printing a braided FRTP structure within an object assembly area of a three-dimensional printer, the extrusion nozzle system including:
　　an extrusion nozzle comprising a first sub-extruder and a second sub-extruder each having a respective channel and being configured to receive a filament material and discharge a respective FRTP strand from an outlet of the extrusion nozzle, and
　　one or more rotation mechanisms configured to rotate the extrusion nozzle about a rotational axis and configured to rotate each of the first and second sub-extruders individually about a respective rotational axis and thereby 3D printing the braided FRTP structure; and
　an extrusion needle system for reinforcing the braided FRTP structure in a z-axis direction, the extrusion needle system including:
　　an extrusion needle having a needle point, a hollow interior channel and an opening provided along a length of the needle, wherein the needle is configured to receive a filament material within the needle channel and discharge the filament material therethrough, and
　　a needle position control mechanism for adjusting a height of the needle in the z-axis direction to penetrate the needle into the braided FRTP structure such that the filament material is discharged from the opening at a prescribed depth within the braided structure.

2. The device of claim 1, wherein the one or more rotation mechanisms include a first rotational mechanism comprising a major rotating gear for rotating the nozzle and a second rotational mechanism comprising two minor rotating gears for rotating the first and second sub-extruders within the nozzle.

3. The device of claim 2, wherein the second rotational mechanism counter-rotates the first and second sub-extruders.

4. The device of claim 1, wherein the extrusion needle system further comprises a rotation mechanism configured to rotate the extrusion needle about a rotational axis.

5. The device of claim 1, wherein the first and second sub-extruders discharge a respective strand of FRTP material through respective outlets and are rotated about a central axis of the respective channels.

6. The device of claim 1, wherein the channels of the first and second sub-extruders converge at the outlet and wherein the rotational axis of the nozzle is a central axis of the outlet and wherein the first and second sub-extruders rotate about a central axis of the respective channels.

7. The device of claim 1, wherein the first sub-extruder is configured to receive a first filament material, the second sub-extruder is configured to receive a second filament material and the extrusion needle is configured to receive a third filament material, and wherein one or more of the first, second and third filament materials comprise continuous filaments of pre-impregnated FRTP material.

8. A system for additive manufacturing of an object from fiber reinforced thermoplastic (FRTP) material having multi-axial reinforcements, the system comprising:
a platform defining an object assembly area;
a print head comprising:
an extrusion nozzle system for 3D printing a braided FRTP material structure within the object assembly area, the extrusion nozzle system including:
an extrusion nozzle comprising a first sub-extruder and a second sub-extruder each having a respective channel and being configured to receive a filament material and discharge a respective FRTP strand from an outlet of the extrusion nozzle, and
one or more rotation mechanisms configured to rotate the extrusion nozzle about a rotational axis and configured to rotate each of the first and second sub-extruders individually about a respective rotational axis; and
an extrusion needle system for reinforcing the braided FRTP structure in a z-axis direction, the extrusion needle system including:
an extrusion needle having a needle point, a hollow interior channel and an opening provided along a length of the needle, wherein the needle is configured to receive a filament material within the needle channel and discharge the filament material therethrough, and
a needle position control mechanism for adjusting a height of the needle in the z-axis direction to penetrate the needle into the braided FRTP structure such that the filament material is discharged from the opening at a prescribed depth within the braided structure;
a position control mechanism configured to controllably position the print head within the object assembly area in an x-y direction; and
a control computer including a processor and a memory, wherein the control computer is configured to control operation of the print-head and the position control mechanism according to an instruction set stored in the memory and executable by the processor.

9. The system of claim 8, wherein the instruction set includes a design file for the object and configures the control computer to produce the object in accordance with the design file by:
controllably moving the print head within the object assembly area,
causing the extrusion nozzle system to controllably extrude respective FRTP material strands from the first and second sub-extruders while controllably rotating the extrusion nozzle and each of the first and second sub-extruders using the one or more rotation mechanisms, and
selectively providing z-axis reinforcements at prescribed locations within a volume of the braided FRTP material using the extrusion needle system.

10. The system of claim 9, wherein the control computer is configured to selectively control a rate at which the first and second sub-extruders extrude the respective FRTP material strands.

11. The system of claim 9, wherein the control computer is configured to selectively control a rate at which the first and second sub-extruders rotate during extrusion of the respective FRTP material strands.

12. The system of claim 8, wherein the control computer is configured to selectively provide the z-axis reinforcements by, at prescribed locations in the x-y direction, penetrating the needle into the braided FRTP structure to a prescribed depth and discharging filament material from the opening of the needle.

13. The system of claim 8, wherein the one or more rotation mechanisms include a first rotational mechanism comprising a major rotating gear for rotating the nozzle and a second rotational mechanism comprising two minor rotating gears for rotating the first and second sub-extruders within the nozzle.

14. The system of claim 13, wherein the second rotational mechanism counter-rotates the first and second sub-extruders.

15. The system of claim 8, wherein the extrusion needle system further comprises a rotation mechanism configured to rotate the extrusion needle about a rotational axis.

16. The system of claim 8, wherein the first and second sub-extruders discharge a respective strand of FRTP material through respective outlets and are rotated about a central axis of the respective channels.

17. The system of claim 8, wherein the channels of the first and second sub-extruders converge at the outlet and wherein the rotational axis of the nozzle is a central axis of the outlet and wherein the first and second sub-extruders rotate about a central axis of the respective channels.

18. The system of claim 8, wherein the first sub-extruder is configured to receive a first filament material, the second sub-extruder is configured to receive a second filament material and the extrusion needle is configured to receive a third filament material, and wherein one or more of the first, second and third filament materials comprise continuous filaments of pre-impregnated FRTP material.

* * * * *